United States Patent
Hribar

(10) Patent No.: US 10,731,672 B2
(45) Date of Patent: Aug. 4, 2020

(54) DUAL ACTION HYDRAULIC CLUTCH SYSTEM

(71) Applicant: James Hribar, Burney, CA (US)

(72) Inventor: James Hribar, Burney, CA (US)

(*) Notice: Subject to any disclaimer, the term of this patent is extended or adjusted under 35 U.S.C. 154(b) by 227 days.

(21) Appl. No.: 15/928,252

(22) Filed: Mar. 22, 2018

(65) Prior Publication Data
US 2018/0274561 A1    Sep. 27, 2018

Related U.S. Application Data

(60) Provisional application No. 62/474,788, filed on Mar. 22, 2017.

(51) Int. Cl.
| | | |
|---|---|---|
| *F15B 7/00* | (2006.01) | |
| *F15B 7/08* | (2006.01) | |
| *F16B 2/06* | (2006.01) | |
| *F16D 67/04* | (2006.01) | |
| *B62K 23/06* | (2006.01) | |
| *B62L 3/02* | (2006.01) | |
| *F16D 121/04* | (2012.01) | |
| *F16D 125/06* | (2012.01) | |
| *F16D 125/10* | (2012.01) | |

(52) U.S. Cl.
CPC .............. *F15B 7/003* (2013.01); *B62K 23/06* (2013.01); *B62L 3/023* (2013.01); *F16B 2/06* (2013.01); *F16D 67/04* (2013.01); *F15B 7/001* (2013.01); *F15B 7/08* (2013.01); *F16D 2121/04* (2013.01); *F16D 2125/06* (2013.01); *F16D 2125/10* (2013.01)

(58) Field of Classification Search
CPC .... F15B 7/003; F15B 7/08; F16B 2/06; F16D 67/04
See application file for complete search history.

(56) References Cited

U.S. PATENT DOCUMENTS

| | | | |
|---|---|---|---|
| 4,132,073 A | | 1/1979 | Ewald |
| 4,299,314 A | * | 11/1981 | Parsons ................. F16D 67/04 192/12 C |
| 4,534,172 A | | 8/1985 | Price et al. |
| 4,585,108 A | | 4/1986 | Leigh-Monstevens |
| 4,621,498 A | | 11/1986 | Schaefer |
| 5,873,444 A | * | 2/1999 | Kozhevnikov ......... F16D 55/02 188/71.7 |
| 9,284,011 B2 | | 3/2016 | Aguilar |

* cited by examiner

*Primary Examiner* — Michael Leslie
*Assistant Examiner* — Daniel S Collins
(74) *Attorney, Agent, or Firm* — Boudwin Intellectual Property; Daniel Boudwin

(57) ABSTRACT

A dual action hydraulic clutch system. The system includes a master cylinder having an outer piston therein, wherein the outer piston includes a channel therethrough that can receive an inner piston therein. A gap is formed between the outer and inner pistons, such that activation of the outer piston activates the inner piston once the outer piston has traveled a length of the gap. The outer piston forces hydraulic fluid through an outer outlet connected to a hydraulic clutch, and the inner piston forces hydraulic fluid through an inner outlet connected to a rear brake, allowing a user to simultaneously disengage the clutch and engage the rear brake. A lever is connected to the outer piston, such that the lever can move the outer piston between a resting position, a clutch position, and a brake position. The master cylinder can secure to a support surface via a mounting bracket thereon.

14 Claims, 4 Drawing Sheets

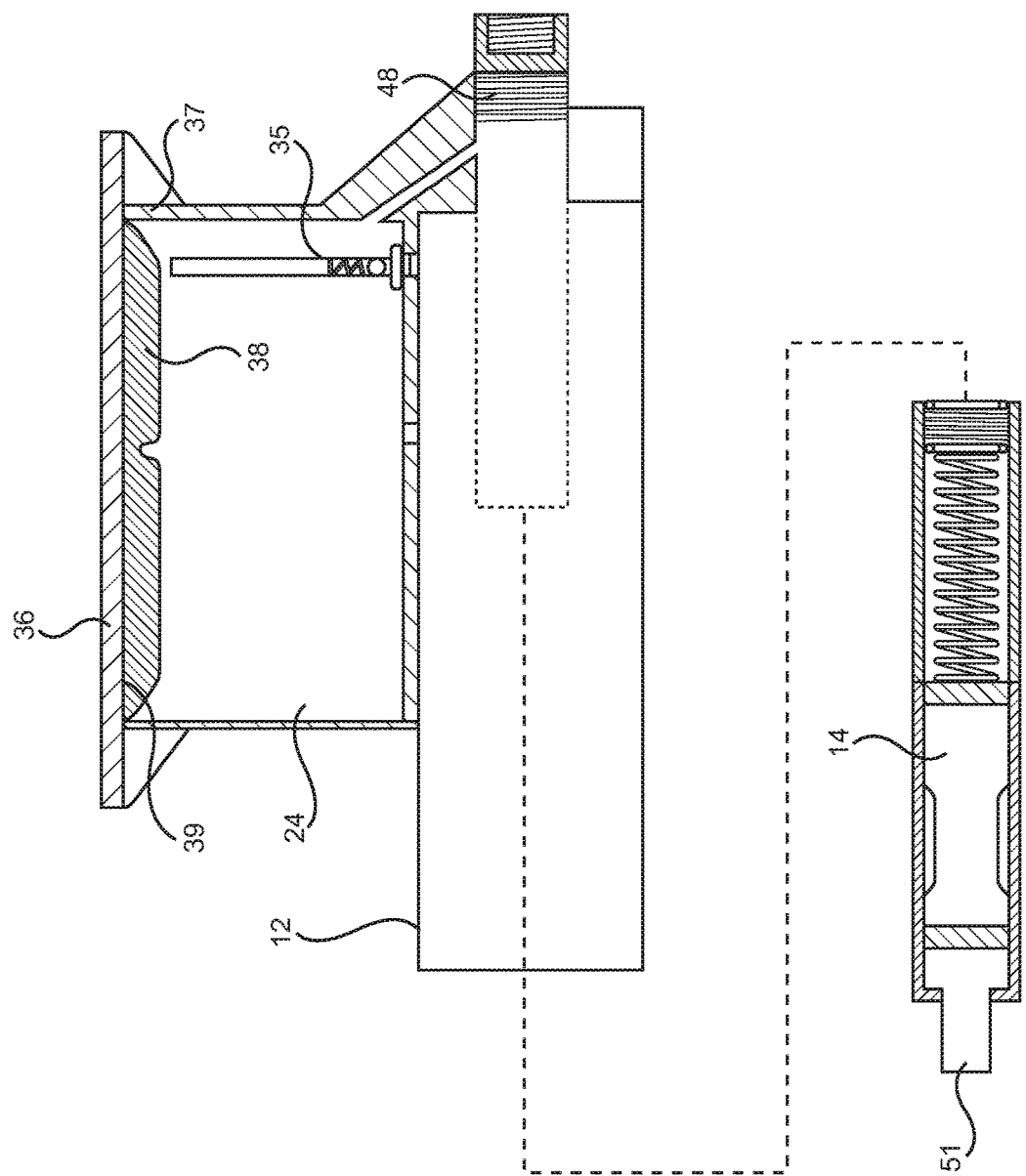

DUAL ACTION HYDRAULIC CLUTCH SYSTEM

CROSS REFERENCE TO RELATED APPLICATIONS

This application claims the benefit of U.S. Provisional Application No. 62/474,788 filed on Mar. 22, 2017. The above identified patent application is herein incorporated by reference in its entirety to provide continuity of disclosure.

BACKGROUND OF THE INVENTION

The present invention relates to a dual action hydraulic clutch system. Specifically, it relates to a dual action hydraulic clutch system wherein an inner piston is actuated by an outer piston to simultaneously release a clutch and actuate a rear brake.

Many people enjoy riding a variety of vehicles, including motorcycles, all-terrain vehicles (ATVs), and the like, however drivers are often unable to use the rear brake to steer the rear-end of the vehicle while executing a turn. Additionally, it can be difficult for riders driving in difficult terrain to manipulate the direction of a vehicle while in the air, as the rider's feet are typically lifted off of the pegs that house the rear brake. When attempting to steer the rear of a vehicle, it typically requires disengaging a clutch with one control, and activating a brake with another control, often requiring a user to remove a hand from a steering wheel or handlebar, which increases the risk of a crash as the driver can easily become distracted. Therefore, a device that allows a user to control the rear brake of a vehicle while simultaneously disengaging the clutch of the vehicle without removing their hands from the steering column is desired.

In light of the devices disclosed in the known art, it is submitted that the present invention substantially diverges in design elements from the known art and consequently it is clear that there is a need in the art for an improvement to existing clutch systems. In this regard, the instant invention substantially fulfills these needs.

SUMMARY OF THE INVENTION

In view of the foregoing disadvantages inherent in the known types of dual action hydraulic clutch systems now present in the prior art, the present invention provides a dual action hydraulic clutch system wherein the same can be utilized for providing convenience for the user when simultaneously releasing a clutch and actuating a rear brake.

The present system comprises a master cylinder having an outer piston and an inner piston therein, wherein the outer piston includes a channel configured to receive an inner piston therein. The inner piston extends along the channel such that a gap is formed between an interior surface of the channel and a proximal end of the inner piston, such that the gap defines a distance the outer piston must travel before actuating the inner piston. An outer pressure chamber is formed annularly about an interior volume of the master cylinder along a lower end of the outer piston and an inner pressure chamber is formed within the interior volume about a distal end of the inner piston. A reservoir configured to hold hydraulic fluid therein is disposed on the master cylinder, wherein the reservoir is in fluid communication with the inner pressure chamber and the outer pressure chamber via an inner inlet port and an outer inlet port respectively. An outer outlet port is disposed through the outer pressure chamber, wherein the outer outlet port is operably connected to a hydraulic clutch, and an inner outlet port is disposed through the inner pressure chamber, wherein the inner outlet port is operably connected to a rear brake. An outer seal is disposed about the lower end, wherein the outer seal is configured to prevent fluid from entering the channel, and an inner seal is disposed about the distal end, wherein the inner seal is configured to prevent fluid from entering the channel. A lever is operably connected to the outer piston, wherein the lever is configured to selectively move the outer piston between a resting position, a clutch position, and a brake position, wherein the interior surface approaches the proximal end when the outer piston is in the clutch position, such that hydraulic fluid is forced through the outer outlet port, thereby disengaging the hydraulic clutch. The interior surface contacts the proximal end such that the inner piston is actuated when the outer piston is in the brake position, such that hydraulic fluid is forced through the inner outlet port, thereby actuating the rear brake. A mounting bracket is disposed on the master cylinder, wherein the mounting bracket is configured to removably secure the master cylinder to a support surface.

In some embodiments, the reservoir further comprises a check valve therein, wherein the check valve is configured to allow fluid from within the master cylinder to return to the reservoir. In another embodiment, the reservoir further comprises a lid removably secured to an upper side of the reservoir. In other embodiments, the lid includes a diaphragm disposed on a lower surface thereof, wherein the diaphragm is configured to prevent the accumulation of air within the reservoir. In yet another embodiment, the reservoir is disposed annularly about the master cylinder. In some embodiments, the outer piston further comprises an adjustment member disposed through the master cylinder and the interior surface, wherein the adjustment member is configured to adjust a linear distance between the proximal end and the interior surface. In another embodiment, an adjustment seal is disposed about the adjustment member, wherein the adjustment seal is configured to prevent fluid from exiting the master cylinder. In other embodiments, the mounting bracket comprises a C-shaped clamp configured to removably secure the master cylinder to a handlebar of a vehicle. In yet another embodiment, the mounting bracket comprises a flange configured to removably secure the master cylinder to a firewall of a vehicle engine. In some embodiments, the master cylinder further comprises a spring-biased clip about a circumference thereof, wherein the spring-biased clip is configured to prevent the outer piston from exiting the master cylinder. In another embodiment, the inner piston is removably securable within the master cylinder via a threaded connection. In other embodiments, the inner and outer seals each comprise a plurality of ribs thereon.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3 shows a cross-sectional exploded view of an embodiment of the dual action hydraulic clutch system with a removable inner piston.

DETAILED DESCRIPTION OF THE INVENTION

Figure 1A:
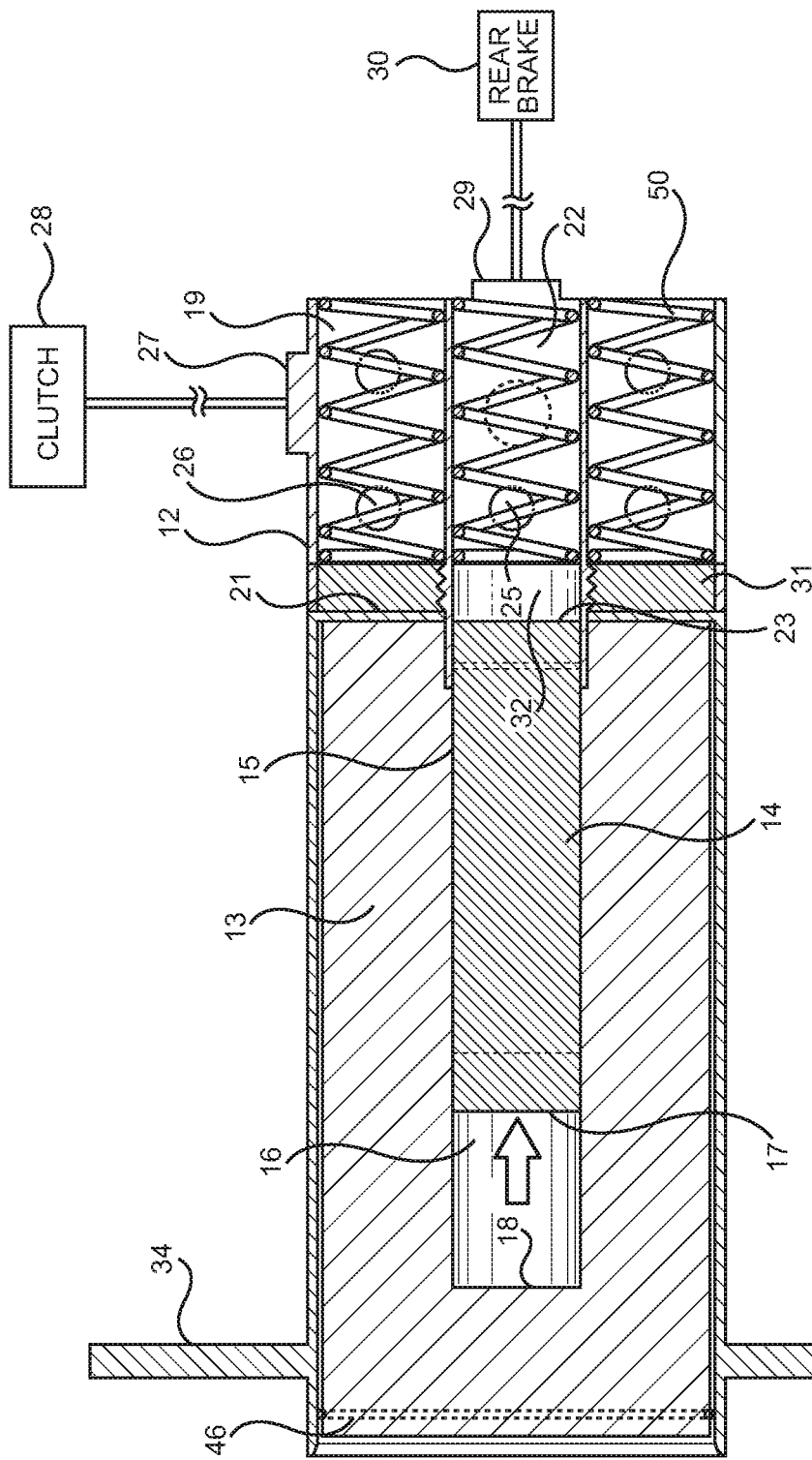
FIG. 1A shows a cross-sectional view of an embodiment of the dual action hydraulic clutch system.

Reference is made herein to the attached drawings. Like reference numerals are used throughout the drawings to depict like or similar elements of the dual action hydraulic clutch system. The figures are intended for representative purposes only and should not be considered to be limiting in any respect.

Figure 1B:
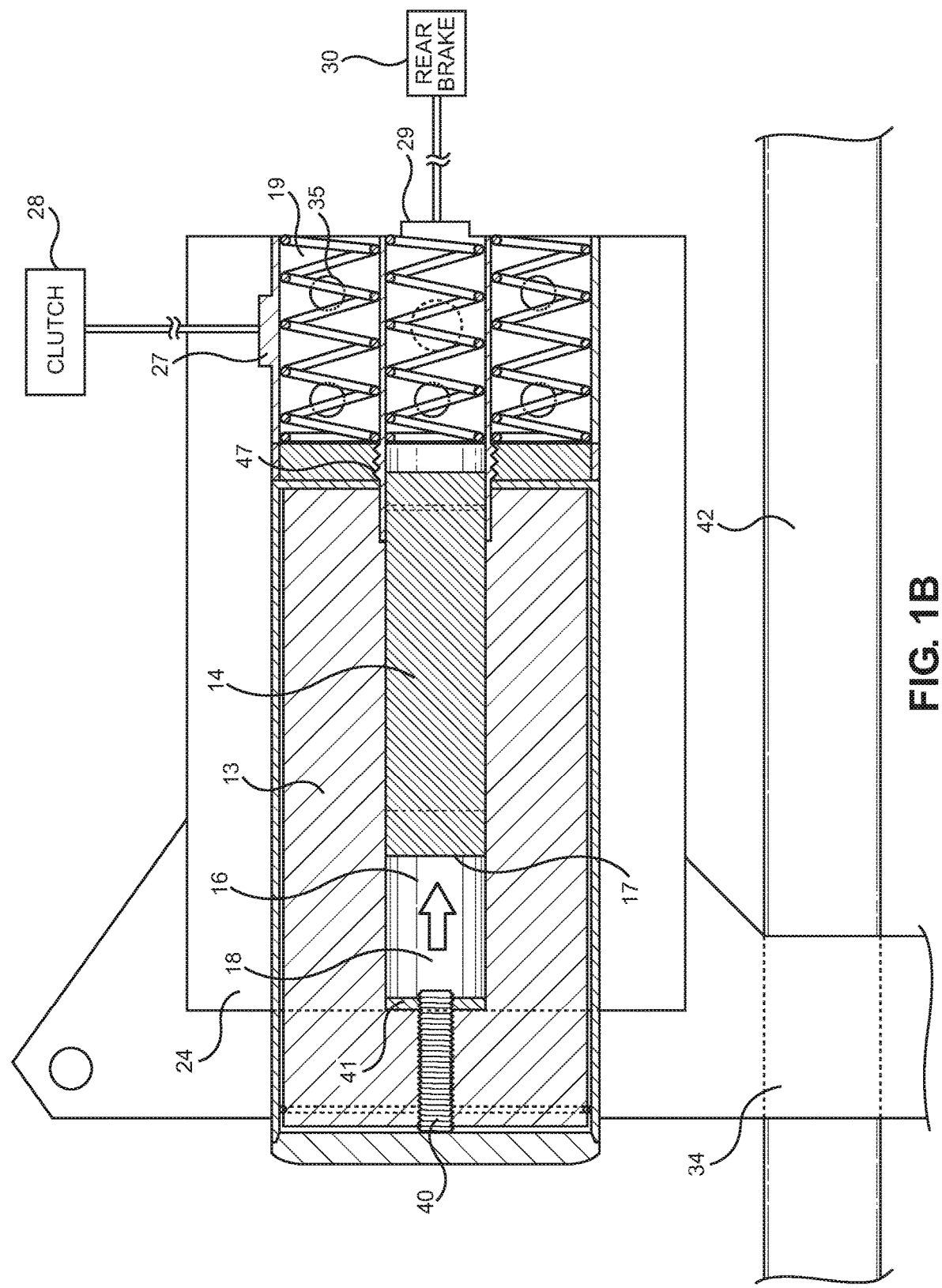
FIG. 1B shows a cross-sectional view of an alternate embodiment of the dual action hydraulic clutch system.

Referring now to FIGS. 1A and 1B, there is shown a cross-sectional view of an embodiment of the dual action hydraulic clutch system and a cross-sectional view of an alternate embodiment of the dual action hydraulic clutch system, respectively. The dual action hydraulic clutch system comprises a master cylinder 12 having an outer piston 13 slidably disposed therein. The outer piston 13 further comprises a channel 15 therein, wherein the channel 15 is configured to slidably receive an inner piston 14 therein. The inner piston 14 extends along the channel 15 such that a gap 16 is formed between an interior surface 18 of the channel 15 and a proximal end 17 of the inner piston 14. The gap 16 defines a linear distance that the outer piston 13 can slide along the master cylinder 12 before contacting the inner piston 14. Once the outer piston 13 has moved the linear distance of the gap 16, the interior surface 18 contacts the proximal end 17 such that further movement of the outer piston 13 moves the inner piston 14 along the master cylinder 12. This arrangement allows a user to actuate the outer piston 13 along the linear distance without actuating the inner piston 14, thereby allowing a user to selectively actuate a system operably connected to the outer piston 13 without actuating a system operably connected to the inner piston 14, or alternatively, simultaneously actuate both of these systems. In this way, the user can operate multiple systems from a single control, wherein the control moves the outer piston 13 between multiple positions. In the illustrated embodiment, the master cylinder 12 further comprises a spring-biased clip 46 disposed about an interior circumference of the master cylinder 12, such that the spring-biased clip 46 is configured to retain the outer piston 13 within the master cylinder 12.

The master cylinder 12 further comprises an outer pressure chamber 19 disposed annularly about the master cylinder 12 at a lower end 21 of the outer piston 13. The outer pressure chamber 19 is configured to receive hydraulic fluid therein, such that when the outer piston 13 is actuated, pressure builds within the outer pressure chamber 19, thereby forcing the hydraulic fluid from the outer pressure chamber 19 to a hydraulic line operably connected thereto. In the illustrated embodiments, the outer pressure chamber 19 comprises an outer outlet port 27 operably connected to a hydraulic clutch 28 of a vehicle. In this way, when the outer piston 13 is actuated, the hydraulic fluid disposed within the outer pressure chamber 19 is forced through the outer outlet port 27 to disengage the hydraulic clutch 28. In the shown embodiments, the outer pressure chamber 19 further comprises a return spring 50 therein, wherein the return spring 50 is configured to return the outer piston 13 to an initial resting position.

The master cylinder 12 further comprises an inner pressure chamber 22, wherein the inner pressure chamber 22 is disposed centrally within the master cylinder 12 and aligned along a longitudinal axis of the inner piston 14, such that the inner piston 14 is configured to force hydraulic fluid from the inner pressure chamber 22 when the inner piston 14 is actuated. In the illustrated embodiments, the inner pressure chamber 22 further comprises an inner outlet port 29, wherein the inner outlet port 29 is operably connected to a rear brake 30, such that the rear brake 30 is actuated by the hydraulic fluid forced through the inner outlet port 29. As the outer piston 13 actuates the inner piston 14, the rear brake 30 is only actuated when the clutch 28 has been disengaged, allowing a user to conveniently disengage the clutch 28 and actuate the rear brake 30 simultaneously. A return spring 50 is disposed within the inner pressure chamber 22, wherein the return spring 50 is configured to return the inner piston 14 to an initial position within the channel 15 of the outer piston 13.

The master cylinder 12 further comprises a reservoir 24 disposed thereon, wherein the reservoir 24 is configured to receive hydraulic fluid therein. In the illustrated embodiment of FIG. 1B, the reservoir 24 is disposed annularly about an exterior of the master cylinder 12. The reservoir 24 is in fluid communication with the inner and outer pressure chambers 22, 19 via an inner inlet port 25 and an outer inlet port 26 respectively. In this way, the inner and outer pressure chambers 22, 19 are kept at capacity, such that actuation of the outer piston 13 and the inner piston 14 can force hydraulic fluid through the outer outlet port 27 and inner outlet port 29, respectively, thereby allowing the hydraulic fluid to travel along hydraulic lines to actuate the hydraulic clutch 28 and rear brake 30. In the illustrated embodiment of FIG. 1B, the reservoir 24 further comprises a check valve 35 disposed between the reservoir 24 and the outer pressure chamber 19, wherein the check valve is configured to allow one-way communication of fluid through the check valve 35 from the outer pressure chamber 19 to the reservoir 24.

In the illustrated embodiment, the master cylinder 12 further comprises an outer seal 31 disposed annularly thereabout between the outer pressure chamber 19 and the lower end 21. The outer seal 31 is configured to prevent leakage of hydraulic fluid from the outer pressure chamber 19, thereby ensuring smooth operation of the outer piston 13. In the illustrated embodiment, the outer seal 31 further comprises a plurality of ribs 47 thereon, wherein the plurality of ribs 47 are configured to provide multiple layers of security between the outer pressure chamber 19 and the master cylinder 12. Should the hydraulic fluid leak from the outer pressure chamber 19 past one of the plurality of ribs 47, the hydraulic fluid must the break through the seal provided by the remaining ribs 47. The inner piston 14 further comprises an inner seal 32 disposed on a distal end 23 of the inner piston 14, wherein the inner seal 32 is configured to prevent leakage of hydraulic fluid from the inner pressure chamber 22, such that the operation of the inner piston 14 is not impeded thereby. In some embodiments, the inner seal 32 further comprises the plurality of ribs 47 as described above for the outer seal 31. In this way, the inner and outer seals 32, 31 can effectively retain the hydraulic fluid within the inner and outer pressure chambers 22, 19, respectively.

The dual action hydraulic clutch system further comprises a mounting bracket 34 disposed on the master cylinder 12. The mounting bracket 34 is configured to removably secure the master cylinder 12 to a support surface. In the illustrated embodiment of FIG. 1A, the mounting bracket 34 comprises a flange extending perpendicularly away from an outer surface of the master cylinder 12, wherein the flange is configured to secure the master cylinder 12 to a surface, such as a wall of an engine compartment of a vehicle. In the illustrated embodiment of FIG. 1B, the mounting bracket 34 comprises a C-shaped clamp configured to removably secure about a handlebar 42 of a vehicle. In some embodiments, the C-shaped clamp is configured to removably secure via friction fit, however in alternate embodiments, the C-shaped clamp removably secures to the handlebar 42 via fasteners. In this way, the master cylinder 12 can be removably secured to various types of vehicles, such as, but not limited to, cars, trucks, ATVs, motorcycles, and the like.

In the illustrated embodiment of FIG. 1B, the dual action hydraulic clutch system comprises an adjustment member 40 extending through the outer piston 13 and the master cylinder 12 such that the user can actuate the adjustment member 40. The adjustment member 40 is configured to decrease the linear distance between the interior surface 18 of the channel 15 and the proximal end 17, such that the outer piston 13 must travel a shorter distance before actuating the inner piston 14. In this way, the user can adjust the sensitivity of the system, allowing the user to actuate the inner and outer pistons 14, 13 using less energy. In the illustrated embodiment, the adjustment member 40 further comprises an adjustment seal 41 thereabout, wherein the adjustment seal is configured to prevent leakage of fluid from the master cylinder 12.

Figure 2:
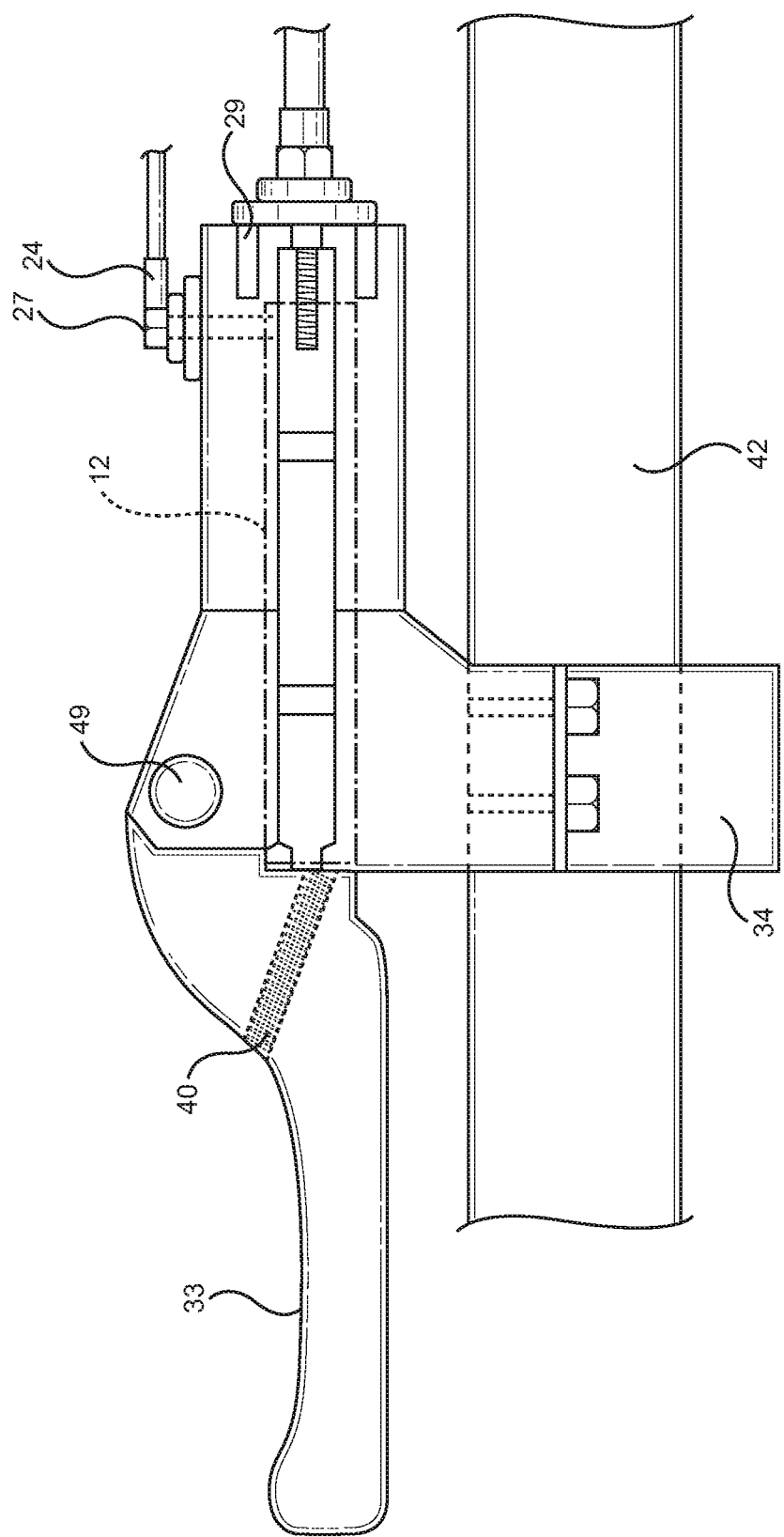
FIG. 2 shows a semi-transparent side view of an embodiment of the dual action hydraulic clutch system installed on a handlebar of a vehicle.

Referring now to FIG. 2, there is shown a semi-transparent side view of an embodiment of the dual action hydraulic clutch system installed on a handlebar of a vehicle. The dual action hydraulic clutch system further comprises a lever 33 pivotally disposed on the master cylinder 12, wherein the lever 33 is configured to pivot about the pivot point 49. In this way, the user can position the lever 33 as desired to easily and comfortably actuate the lever 33. In the illustrated embodiment, the lever 33 comprises an elongated member configured to be within reach of a thumb of the user when the user is gripping a handlebar 42. Alternate activation controls are contemplated, such as switches, buttons, dials, and the like. The lever 33 is configured to selectively move the outer piston between a resting position, a clutch position, and a brake position, such that the user can decide whether to disengage the clutch alone by moving the outer piston into the clutch position or disengage the clutch and engage the rear brake when the outer piston is in the brake position. For example, an initial actuation of the lever 33 can move the outer piston into the clutch position to disengage the clutch via the outer outlet port 27, while further actuation of the lever 33 results in the outer piston traveling further along the master cylinder 12, actuating the inner piston, leading to the rear brake to be actuated via the inner outlet port 29 while the clutch is disengaged.

In the illustrated embodiment, the adjustment member 40 is disposed on the lever 33, such that a user can easily reach the adjustment member 40 to adjust the sensitivity of the dual action hydraulic clutch system. In this way, the user can determine how much pressure must be placed on the lever 33 before triggering the inner cylinder such that the rear brake is actuated at the same time as the clutch is disengaged. Furthermore, the mounting bracket 34 comprises a C-shaped clamp disposed about a handlebar 42 of a vehicle, wherein the illustrated embodiment, the mounting bracket 34 is secured to the handlebar 42 via fasteners.

Referring now to FIG. 3, there is shown a cross-sectional exploded view of an embodiment of the dual action hydraulic clutch system with a removable inner piston. In the illustrated embodiment, the inner piston 14 is removably securable within the master cylinder 12 via a threaded connection 48. In this way, the user can disassemble the master cylinder 12 to perform maintenance on the components thereof in an efficient manner. In the illustrated embodiment, the inner piston 14 further comprises a protrusion 51, wherein the protrusion 51 is configured to shorten the distance between the inner piston 14 and the outer piston, such that the outer piston is required to travel a lesser distance before actuating the inner piston 14. Additionally, this arrangement allows the inner piston 14 to be disposed in a separate housing, wherein the housing is removably securable to the master cylinder 12 via the threaded connection 48, such that a user can interchange various inner pistons 14 having differing resistances or protrusions 51 of various lengths, allowing the user to customize the sensitivity of the dual action hydraulic clutch system.

In the illustrated embodiment, the reservoir 24 is disposed above the master cylinder 12, such that the reservoir 24 can comprise a larger volume than an annular version. The reservoir 24 of FIG. 3 further comprises a lid 36 removably securable to an upper side 37 of the reservoir 24, such that the lid is affixed thereto. In the shown embodiment, the lid 36 further comprises a diaphragm 38 disposed on a lower surface 39 of the lid 36, wherein the diaphragm 38 is configured to expel excess air from the reservoir 24 when the lid 36 is secured to the upper side 37. Additionally, the diaphragm 38 can provide frictional engagement with the upper side 37, further securing the lid 36 to the upper side 37. A check valve 35 is disposed within the reservoir 24, wherein the check valve 35 is configured to allow hydraulic fluid to return to the reservoir 24 from the master cylinder 12.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual action hydraulic clutch system, comprising:
a master cylinder having an outer piston and an inner piston therein;
wherein the outer piston comprises a channel configured to receive an inner piston therein;
wherein the inner piston is configured to extend along the channel such that a gap is formed between a proximal end of the inner piston and an interior surface of the channel;
an outer pressure chamber formed annularly about an interior volume of the master cylinder along a lower end of the outer piston;
an inner pressure chamber formed within the interior volume about a distal end of the inner piston;
a reservoir configured to hold hydraulic fluid therein;

wherein the reservoir is in fluid communication with each of the inner pressure chamber and the outer pressure chamber via interior inlet ports and outer inlet ports, respectively;

an outer outlet port through the outer pressure chamber, wherein the outer outlet port is operably connected to a hydraulic clutch;

an inner outlet port through the inner pressure chamber, wherein the inner outlet port is operably connected to a rear brake;

a lever operably connected to the outer piston, wherein the lever is configured to selectively move the outer piston between a resting position, a clutch position, and a brake position;

wherein the interior surface approaches the proximal end when the outer piston is in the clutch position, forcing hydraulic fluid through the outer outlet port, thereby disengaging the hydraulic clutch;

wherein the interior surface contacts the proximal end such that the inner piston is actuated when the outer piston is in the brake position, forcing hydraulic fluid through the inner outlet port, thereby actuating the rear brake.

2. The dual action hydraulic clutch system of claim 1, wherein the reservoir further comprises a check valve therein, wherein the check valve is configured to allow fluid from within the master cylinder to return to the reservoir.

3. The dual action hydraulic clutch system of claim 1, wherein the reservoir further comprises a lid removably securable to an upper side of the reservoir.

4. The dual action hydraulic clutch system of claim 3, wherein the lid further comprises a diaphragm on a lower surface thereof, wherein the diaphragm is configured to prevent air from accumulating within the reservoir.

5. The dual action hydraulic clutch system of claim 1, wherein the reservoir is disposed annularly about the master cylinder.

6. The dual action hydraulic clutch system of claim 1, wherein the outer piston further comprises an adjustment member disposed through the master cylinder and the interior surface, wherein the adjustment member is configured to adjust a linear distance between the proximal end and the interior surface.

7. The dual action hydraulic clutch system of claim 6, wherein an adjustment seal is disposed about the adjustment member, wherein the adjustment seal is configured to prevent fluid from exiting the master cylinder.

8. The dual action hydraulic clutch system of claim 1, wherein the master cylinder further comprises a spring-biased clip about a circumference thereof, wherein the spring-biased clip is configured to prevent the outer piston from exiting the master cylinder.

9. The dual action hydraulic clutch system of claim 1, wherein the inner piston is removably securable within the master cylinder via a threaded connection.

10. The dual action hydraulic clutch system of claim 1, wherein the inner and outer seals each comprise a plurality of ribs thereon.

11. The dual action hydraulic clutch system of claim 1, further comprising an outer seal disposed about the lower end, wherein the outer seal is configured to prevent fluid from entering the channel and an inner seal disposed about the distal end, wherein the inner seal is configured to prevent fluid from entering the channel.

12. The dual action hydraulic clutch system of claim 1, further comprising a mounting bracket configured to removably secure the master cylinder to a support surface.

13. The dual action hydraulic clutch system of claim 12, wherein the mounting bracket comprises a C-shaped clamp configured to removably secure the master cylinder to a handlebar of a vehicle.

14. The dual action hydraulic clutch system of claim 13, wherein the mounting bracket comprises a flange extending perpendicularly away from an outer surface of the master cylinder, the flange configured to removably secure the master cylinder to a support surface.

* * * * *